United States Patent [19]

Sager et al.

[11] Patent Number: 4,628,508
[45] Date of Patent: Dec. 9, 1986

[54] COMPUTER OF PROCESSOR CONTROL SYSTEMS

[75] Inventors: John C. Sager, Ipswich; Kenneth D. Odam; Robert T. Boyd, both of Woodbridge; Peter W. Dell, Ipswich, all of England

[73] Assignee: British Telecommunications, London, England

[21] Appl. No.: 731,617

[22] Filed: May 7, 1985

Related U.S. Application Data

[63] Continuation of Ser. No. 363,521, Mar. 30, 1982, abandoned.

[30] Foreign Application Priority Data

Mar. 31, 1981 [GB] United Kingdom ............... 8110068

[51] Int. Cl.⁴ ........................................... G06F 11/20
[52] U.S. Cl. ...................................... 371/9; 364/187; 364/200
[58] Field of Search ............... 364/187, 200 MS File, 364/ 900 MS File; 371/8, 9, 22

[56] References Cited

U.S. PATENT DOCUMENTS

| | | | |
|---|---|---|---|
| 3,377,623 | 4/1968 | Reut et al. | 364/200 |
| 3,623,014 | 11/1971 | Doelz et al. | 364/200 |
| 3,848,116 | 11/1974 | Möder et al. | 371/9 |
| 4,071,704 | 1/1978 | Moed | 371/22 |
| 4,133,027 | 1/1979 | Hogan | 364/200 |
| 4,195,351 | 3/1980 | Barner et al. | 364/900 |
| 4,228,496 | 10/1980 | Katzman et al. | 364/200 |
| 4,347,564 | 8/1982 | Sugano et al. | 364/187 |
| 4,351,023 | 9/1982 | Richer | 371/9 |
| 4,358,823 | 11/1982 | McDonald et al. | 364/200 |

Primary Examiner—Gareth D. Shaw
Assistant Examiner—Daniel K. Dorsey
Attorney, Agent, or Firm—Nixon & Vanderhye

[57] ABSTRACT

A processor control system for controlling items of hardware includes pairs of processors associated with the hardware items. One processor of each pair operates the process or processes for controlling the associated hardware, while the other processor of each pair operates other processes. In the event of a fault in one processor the processes on that processor are transferred to spare processors and the hardware control process is transferred to the other processor of the pair. This arrangement makes more effective use of standby processing capacity.

12 Claims, 8 Drawing Figures

COMPUTER OF PROCESSOR CONTROL SYSTEMS

This is a continuation of application Ser. No. 363,521, filed Mar. 30, 1982, which was abandoned upon the filing hereof.

DESCRIPTION

This invention relates to computer or processor control systems.

Computer or processor control systems for controlling external hardware are known in which each item of hardware has associated hardware controllers linked to a central processing unit (CPU). The hardware controllers interface the CPU with the hardware to reduce the load on the CPU and the hardware controllers are normally duplicated to provide fault tolerance. One normally carries out the control functions whilst the other acts as a standby and is only brought into operation if the first one suffers a fault. In such an arrangement there is much spare processing capacity in the unused standby hardware controllers.

A control system of this form generally includes a set of processors or computers for controlling the hardware and has to include the following features to enable it to recover from a processor failure. There has to be hardware redundancy to provide fault tolerance i.e. there has to be spare processing capacity. An objective of such a system is to provide the minimum of spare capacity necessary to achieve the required degree of fault tolerance. The system should also have fault recovery, that is to say there should be a controlling procedure for arranging the use of the redundant hardware in the event of a failure. This involves reallocating software on a failed processor to run on the spare capacity hardware with minimum processing loss and disruption.

In general terms the software for a computer or processor control system normally consists of a set of communicating processes. These processes can be considered to fall into two general categories:
(a) hardware-handler processes which communicate directly with external hardware and perform hardware handler functions.
(b) software-only processes which communicate only with other processes.

Each hardware handler process has to run on a processor which directly interfaces with that item of hardware which it is to control. Thus, for security against processor failure there are generally at least two processors connected to each item of hardware to cater for the event of a processor failure. This results in an arrangement having duplicated hardware controller processors associated with each item of hardware.

The present invention relates to a computer control system which is designed to make maximum use of the duplicated processors.

According to one aspect of the present invention there is provided a computer or processor control system for controlling items of hardware, said system comprising a plurality of interconnected processors some of which are arranged in pairs so that a pair of processors is associated with each item of hardware and others of which provide one or more spare processors, one processor of each said pair being arranged to operate a process or processes for controlling its associated hardware and the other processor of each said pair normally being arranged to operate other processes and wherein in the event of a fault occurring in one of said hardware controlling processors the other processes are transferred from the other processor of that pair to a spare processor or processors and the hardware control process is transferred to said other processor.

By arranging a control system in this manner it is possible to provide fault tolerance with less spare processing capacity than has previously been achieved. This is achieved by using the duplicate processors for software only processes and providing sufficient spare processors to permit transfer of those processes in the event of a hardware control processor failure and thereby free the duplicate processor for the hardware handler process or processes.

The processors may be linked by a loop or ring type interconnection.

In one form of the invention two spare processors are linked as a pair to a process store and said other processes are initially transferred to said pair of spare processors. The other processes may subsequently be transferred to one or more other spare processors.

According to another aspect of the present invention there is provided a method of controlling items of hardware by a plurality of processors, the method comprising arranging the processors in pairs so that a pair of processors is associated with each item of hardware and so that there are one or more spare processors, controlling each hardware item by means of a hardware control process or processes operating in one processor of the associated pair, and operating other processes in the other processor of each pair, wherein in the event of fault occurring in one of said hardware controlling processors the other processes are transferred from the other processor of that pair to a spare processor or processors and the hardware control process is transferred to said other processor.

The invention will be described now by way of example only with particular reference to the accompanying drawings. In the drawings.

Figure 1:
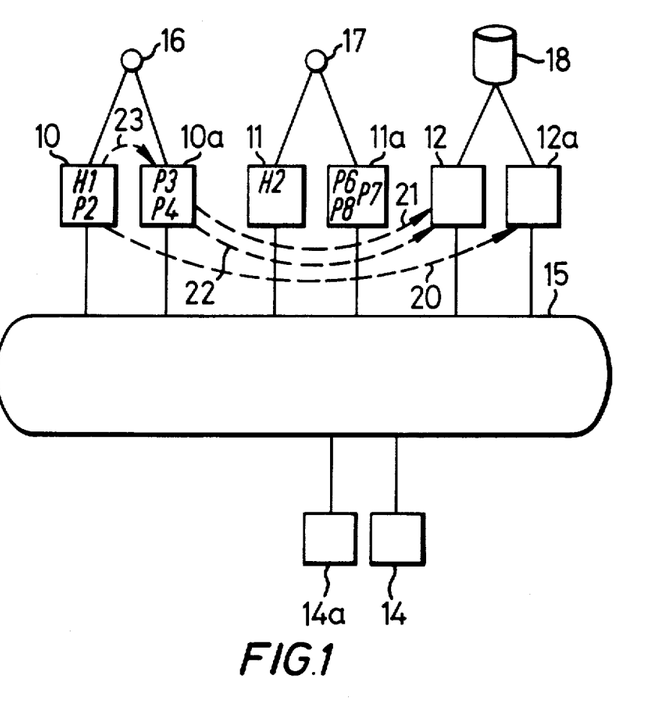
FIG. 1 is a schematic diagram of a computer control system in accordance with the present invention.

The system shown in FIG. 1 comprises a plurality of processors 10, 10a; 11, 11a; 12, 12a; 14, 14a. The processors are interconnected by a data bus 15 which is in the form of a loop to permit communication between processors. The processors 10 and 10a form a pair of processors linked to external hardware item 16, the processors 11, 11a are linked as a pair to external hardware item 17, and the processor 12, 12a are linked as a pair to a disc store 18. The processor 10 forms the primary hardware control processor for the hardware 16 and contains the hardware handler process for that hardware. This process is identified by the reference H1 on FIG. 1. Similarly the processor 11 comprises the main hardware control processor for the hardware 17 and that hardware handler process is identified by the reference H2. Although only two items of hardware 16 and 17 are shown on FIG. 1 it will be appreciated that many more can be linked by the loop 15. The disc store 18 contains load modules for all the hardware handler processes and software only processes operated by the system.

In addition to the hardware handler process H1 the processor 10 also contains a software only process identified by the reference P2. The processor 10a contains and is arranged to operate software only processes identified by references P3 and P4. Similar processes are contained within the processor 11a and identified by the references P6, P7, P8. Thus it will be seen that in normal operation of the system the duplicate or standby processors 10a and 11a are operating software only processes so that use is made of these standby processors. The system shown in FIG. 1 can be used to control many types of external hardware e.g. switching equipment in a telephone exchange.

In the event of a failure in one of the hardware handler processors the following occurs. Consider the case where the processor 10 fails. In this situation the processor 10a has to take over the hardware handler process function originally carried out by the processor 10. The first stage of recovery is to move the software only process P2 to a standby processor which in this case is the processor 12a. This operation is represented by the dotted line 20. The software only process P3 is moved to its standby processor which in this case is the processor 12. This is represented by the dotted line 21. The software only process P4 is also moved to the processor 12 as represented by the dotted line 22. Having moved the processes P3 and P4 from the processor 10a the hardware handler process H1 can then be moved into the standby processor 10a as represented by the dotted line 23.

It will be appreciated that the dotted lines 21 to 23 are schematic illustrations only and in fact for example the load modules for H1 may not be physically moved from the processor 10 to 10a but may be drawn from the disc 18 via one of the processors 12 or 12a and fed into the processor 10a via the loop 15. Having moved the hardware handler process H1 to the processor 10a the software only processes P2, P3, P4 contained within the processors 12 and 12a can then be allocated to other spare processors such as those indicated by reference numerals 14, 14a. This then releases the processors 12, 12a for use in the manner similar to that described above should any further hardware handler processes fail.

The processes P2, P3, P4 could have been moved directly from processors 10, 10a, to processors 14, 14a instead of via the processors 12, 12a, if the load modules for P2, P3, P4 were already resident in processors 14, 14a or if fast loading of these modules was unnecessary.

It will be noted in the arrangement shown in the FIG. 1 that standby processors 12, 12a for the software only processes are directly coupled to the backing store 18 and this has the advantage that load modules for these processes can be down loaded directly to the standby processors. As described these can then be moved to other spare processors once the hardware handler process H1 has been transferred to its standby processor. This second stage of recovery can be carried out in a prepared and relatively unhurried manner at a convenient time.

It will be seen that the present arrangement includes a set of paired or duplicated hardware controllers which are used in a way which reduces the overall hardware redundancy of the system necessary to maintain fault tolerance. The standby processor of each pair is used to operate software-only processes which are moved to other processors with spare capacity in the event of failure of the controller which is operating the hardware handler process. The arrangement is such that the total unused or spare processing capacity can be reduced considerably over the prior art arrangements by making use of the spare capacity in the duplicated processors.

Each software-only process can generally run on any processor having sufficient processing capacity of time and storage. Therefore, for software-only processes, the system need not be treated as a set of worker/standby pairs but as a single processing resource where allocation of processes to run on processors is determined primarily by the distribution and availability of processing capacity. Consequently the software-only processes can be allocated to standby hardware controller processors provided the recovery procedure for transferring these processes as described above is implemented.

A more detailed description of an example of a system embodying the present invention will now be given. The main components of such a system are processing modules such as the modules 10, 10a; 11, 11a; 12, 12a, shown in FIG. 1, a module interconnection arrangement such as the ring or loop 15 or FIG. 1 and an operating system.

Figure 2:
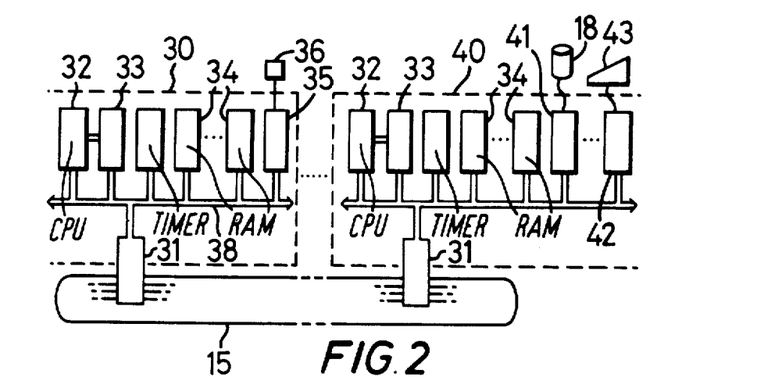
FIGS. 2 and 2a are block diagrams illustrating processing modules which can be used in the system of FIG. 1.

The processing modules have been described briefly with reference to FIG. 1. FIG. 2 is a more detailed diagram showing the form which the processing modules can take. The module shown at 30 is connected to the ring 15 by an interface circuit 31. The module 30 comprises a CPU 32 which can be for example a Motorola 68000 microprocessor, a memory management unit 33, RAM's 34, and control circuitry 35 for interfacing with an item of external hardware 36, all of which are linked to a microprocessor bus 38. This configuration is a conventional configuration and hence will not be described in any more detail. The processing module shown at 40 in FIG. 2 is similar to that shown at 30, the main difference being that the module 40 has a control circuit 41 for interfacing with the disc store 18 and a control circuit 42 for interfacing with a terminal 43. For simplicity only two processing modules have been illustrated in FIG. 2 but it will be appreciated that there will be several similar modules distributed around the ring 15, at least some of which are arranged in pairs and associated with external hardware as described with reference to FIG. 1.

The ring or loop 15 which interconnects the processing modules should have a high bandwidth, typically >1M bit/sec. It is preferred that a braided type ring interconnection be employed for increased reliability.

Figure 2A:
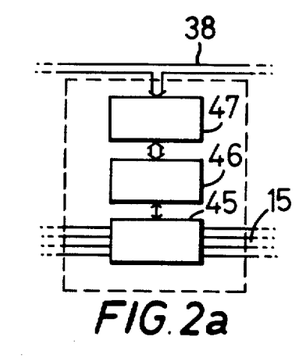

The interface circuit 31 can take the form shown in FIG. 2a. The circuit includes a first part 45 which is connected in the braided ring 15 and carries out bit level functions including serial data transmission and reception, data coding and decoding, clock regeneration and bit synchronisation and braid switching. A second part 46 carries out message level functions including frame synchronisation, identification of address and control fields, error detection, token detection, bit stuffing and unstuffing and status indication.

A third part 47 interfaces with the processing module and provides an interface to the processor bus 38, input and output buffering of messages to and from the processing module, and coordination of control between the processing module and the ring interface unit 45.

Figure 3:
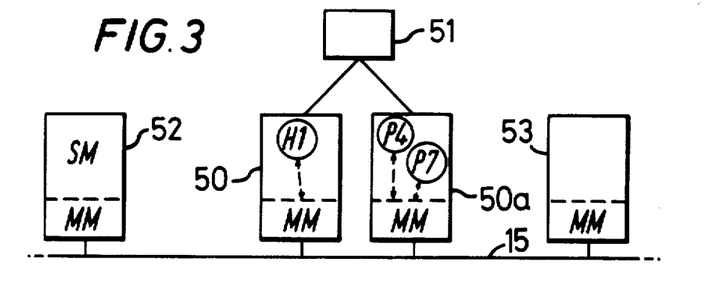
FIGS. 3 and 4 are block diagrams illustrating the operation of the present system.

The recovery procedure, which is put into effect when a hardware handler process fails as described with reference to FIG. 1, is controlled by the operating system. The way in which this operates will be described with reference to FIGS. 3 and 4. FIG. 3 is a simplified diagram showing a single processing module pair 50 50a and associated external hardware 51. The hardware 51 is controlled by a hardware handler process H1 which normally operates on processing module 50. Software-only processes P4, P7 operate on the processing module 50a.

The operating system includes a system manager (SM) which is shown as operating on a processing module 52 and module managers (MM) which are distributed one to each processing module of the system. Each module manager MM performs internal management of its processing module and handles interprocessor communication. It responds to commands from and reports to the system manager SM.

The system manager SM is responsible for the overall supervision of the processor system, in particular for system maintenance and configuration management. The system manager SM can generally be centralised on a single processing module as shown in FIG. 3 and incorporates the ability to restart itself on another processing module in the event of failure of the module on which it is running.

The system manager coordinates recovery from a processing module failure by issuing commands in the form of interprocessor messages to individual module managers. The system manager cyclically interrogates the processing modules to check their condition. If, for example, the interrogation of processing module 50 indicates that that module has failed, the system manager issues a command to the module manager of module 50 to cause processing on that module to cease.

The system manager then issues a command which is transmitted to a further processing module 53. This command instructs the module manager of module 53 to create processes P4, P7 by allocating memory and downloading the process code and data from the store 18 and/or from the module 50a. These processes are held in a dormant state on module 53.

Figure 4:
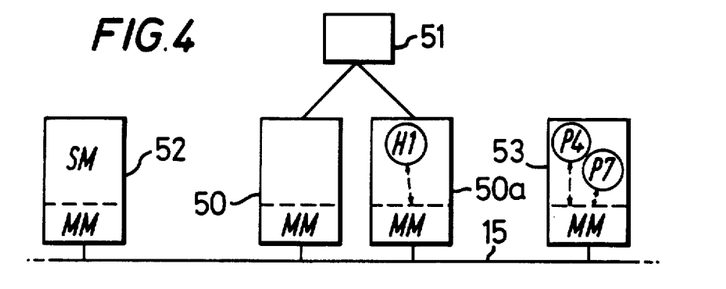

The system manager then issues a command to the module manager of module 50a to terminate execution of processes P4, P7 following which it issues a command to module 53 to activate execution of processes P4, P7 on that processor. The system manager then issues a command to the module manager of module 50a to destroy processes P4 and P7 on that module and thereby make available the memory which was allocated to those processes. Finally the system manager SM issues a command to module 50a to create process H1 and start that process. The module manager of module 50a allocates the necessary resources, downloads the process code and data for process H1 and activates the execution of that process. Thus the final configuration is as shown in FIG. 4 with H1 operating on the module 50a and processes P4, P7 on module 53.

The form of the processes and interprocess communication will now be described in more detail particularly with reference to process or failure. The operating system is designed to maintain the execution of processes in the event of a fault. A process is defined as the sequential execution of a series of program statements, the sequential execution of which may be concurrent with other processes. More than one "instance" of a process can exist, i.e. there can be more than one sequential execution of the same series of program statements. Each instance of a process has a name to which messages can be addressed.

A process can send data to another process by sending a "message". A message includes the name of the destination process (instance). The present system can use the prrogramming language CHILL (CCITT high level programming language) and the definitions of process and message applicable to that programming language apply in the present part of the description. The operating system is mainly composed of processes (except for the low level kernel of the module manager). The module manager part of the operating system as described previously is a group of processes which is resident on each processing module i.e. a separate set of instances of the module manager processes is on each processing module. The system manager is a single group of processes, i.e. there is only one instance of each process. As indicated with the reference to FIG. 3 this is normally resident on one processing module but could be distributed over several processing modules. Non-operating system processes are classified as application processes and include for example hardware handler processes.

Figure 5:
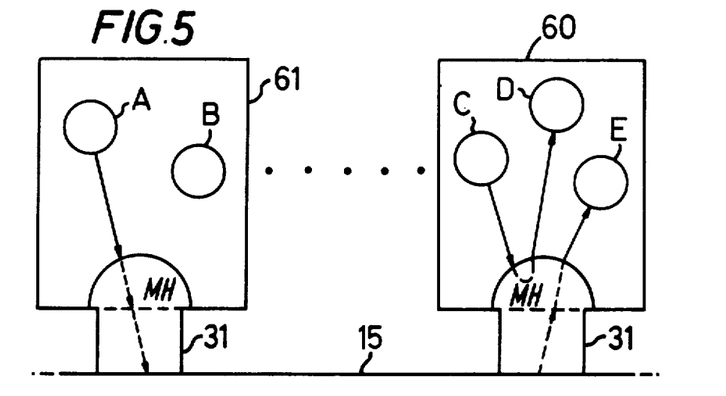
FIG. 5 illustrates how messages are transmitted between processes in the system.

A message sent by a process is initially received by a Message Handler within the module manager of the processing module on which the message sender is resident (see FIG. 5). The message handler MH reads the destination process (instance) name of the message. If the message is destined for a process on that module the message is attached to the input message queue of the process. Such a procedure is illustrated in FIG. 5 for the processes C and D operating on the module 60. Data to be sent from process C is received by the message handler MH of module 60 and then directed to process D.

If the message is destined for process on another module the message is transmitted over the module interconnection link 15. The link interface unit 31 on each processing module compares the destination address of this message with the names of its resident process instances and copies the message if there is a match. The message is then taken by the message handler of that processing module and attached to the input message queue of the destination process for reception by the process. Such a procedure is illustrated in FIG. 5 for data sent by a process A from processing module 61 to process E on processing module 60.

At the level of the programming language messages are expressed in a symbolic format and syntax of the form:

Send message name (data values) to process instance name e.g.

Send line numbers (4, 6, 78) to call control 3.

This message form is transformed by the language compiler to a non-symbolic representation and is further transformed by the message handler MH of the processing module into a packet format which includes packet fields for source and destination addresses, message length and control information, and error checking. The frame format at the lowest level of communication is based on the HDLC (high level data link control) standard format.

The following controlling operations can be carried out on a process:

(a) an instance of a process can be created (b) a created process instance can be started (c) a started process instance can be stopped (d) a stopped (or not started) process instance can be destroyed.

Messages requesting these operations are sent to a process handler in the module manager. In particular the system manager sends messages requesting these operations to individual process handlers during the recovery procedure described above. The functions performed by a process handler in a module manager on reception of these messages are as follows:

(a) creating an instance of a process. The received message contains the following data—the name of the process and the name by which the created instance is to be known. The process handler allocates all resources needed for the process to run. This may require downloading process code and data files, if not already present, by sending messages requesting a file server module process, on a processing module attached to a system filestore, to transmit the file. The control block is created for the process instance and the process instance set ready for execution. The process handler replies to the requesting process that the process instance has been created.

(b) starting a process instance. The received message contains the name of the process instance to be started and the mode of starting e.g. initial start, rollback restart. The process handler activates execution of the named process instance, unless it has not been created in which case an error message is returned.

(c) stopping a process instance. The process handler terminates execution of the process instance named in the message, and sets it in a dormant state. It can be restarted by a start message. Messages addressed to the stop process instance are not accepted.

(d) destroying a process instance. The process handler frees all resources allocated to the process instance named in the message, e.g. memory used, and deletes all record of the process instance. Following this it would be necessary to create a process instance again if it were to be restarted.

Figure 6:
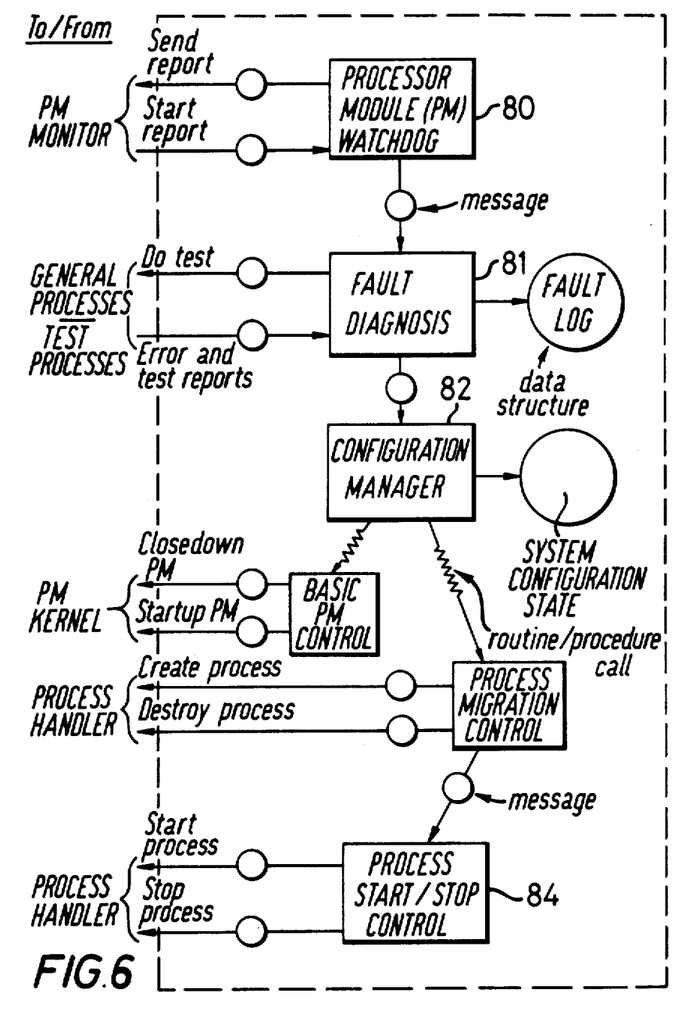
FIG. 6 is a block diagram illustrating the system manager part of the operating system of the present system.
Figure 7:
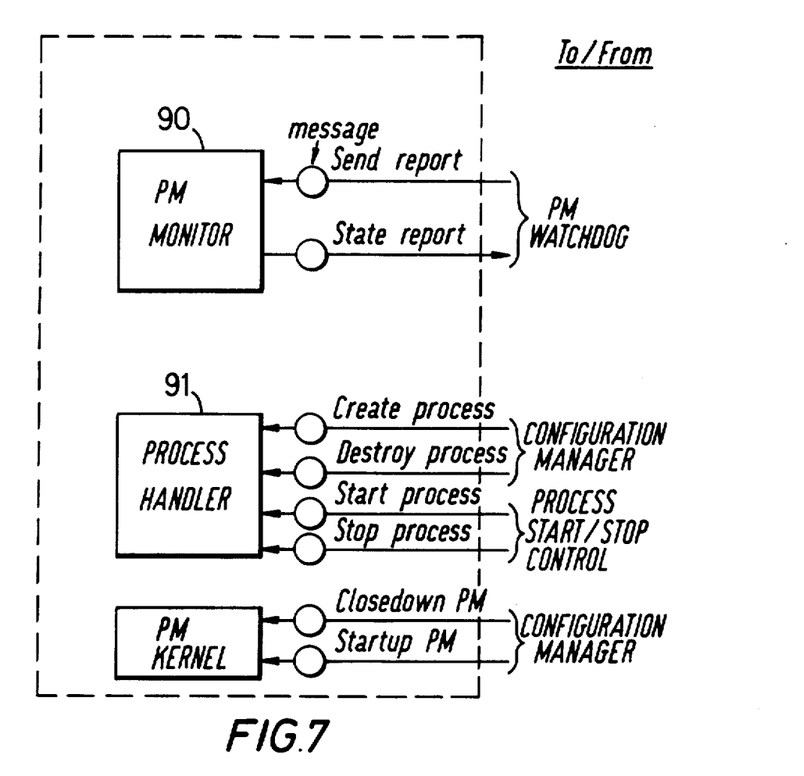
FIG. 7 is a block diagram illustrating a module manager which forms part of the operating system.

The recovery procedure which has been described above has been explained in terms of the message flow between the system manager and module manager parts of the operating system. These messages are sent and received by the processes making up the module manager and the system manager. FIGS. 6 and 7 respectively illustrate the basic internal structure of the system manager and module manager in terms of the processes concerned with fault detection and recovery.

The fault handling procedure is as follows. The states of processor modules are monitored by a processing module watchdog process 80 which forms part of the system manager. This watchdog process periodically requests status report messages from each module in turn. On receiving a failure report, or in the absence of an expected report, the watchdog process informs a fault diagnosis process 81. The diagnosis process correlates this information with other error report messages it may receive from processes in general. It validates and analyses the reports and informs a configuration manager 82 of its diagnosis.

The configuration manager 82 maintains, in tables, a record of current state of the system in the form of a description of each processing module and each process. This includes specifications of process module resources, process resource requirements, and the current allocation of process instances to the processing modules. This configuration description also includes standby process and module specifications from which the configuration manager 82 can determine the reallocation of process instances to processor modules in the event of failure of a module. On receiving a process and module failure notification from the fault diagnosis process 81 the configuration manager determines what reallocation of process instances is needed for recovery. A message is sent to close down and isolate failed processing module. It then coordinates the recovery procedure by sending control messages to the module managers. These messages are principally to create, start, stop and destroy, as described above and are sent to the process handlers of the processing modules concerned. The sequence of these messages has already been described above.

Referring particularly to FIG. 6 the watchdog process 80 requests and receives status messages from a processing module monitor process which operates on each processing module. A timer is kept for each processing module. On initial systems startup all the processing modules are set failed. Processing module status request messages are then sent and covering time out started. If a processing module on request is returned the timer for that processing module is reset. The processing module status is then changed to working. The processing status request messages are then sent at subsequent intervals. If a timer times out without the corresponding watchdog message being received the status is changed to failed. A report is sent to the fault diagnosis process 81 every time the processing module status changes. This is validated before being passed on to the configuration manager 82. The system manager then changes its records concerning the system state and may migrate instances from one processing module to another depending on the new information.

The fault diagnosis process receives processing module status reports from the watchdog process 80, and error reports and rollback requests from processes in general. It can request diagnostic tests to be carried out on a processing module. These reports are correlated, validated and logged. Fault diagnostic results are passed to the configuration manager 82.

The configuration manager is a process which controls access to and updating of the data base defining the global system state. Three main sets of records are held:

1. Processing module records describing each processing module, its resources and operational state.
2. Process records describing the processing requirements of each process.
3. Instance records, associated with their respective process records, defining the current and standby allocation of process instances to programming modules.

These are records defining the state of each processing module, of each process and its associated instances, and the current and standby allocations of process instances to the processing modules. An initial definition of the system is loaded as a data file at initial system startup. Thereafter it is subject to updating by the configuration manager 82 in the event of faults or of commands respecifying the system via for example a keyboard terminal input.

On receiving a message from a keyboard or fault diagnosis message requesting a reconfiguration of the system, the configuration manager determines the necessary changes from its records. It controls these changes and updates its records accordingly. The changes are carried out by sending instruction messages in an orderly sequence to the processes. In the case of recovery from processing module failure these messages mainly control the migration of process instances and are mostly directed to processing module process handlers (via the start/stop process in the case of start and stop commands).

The start/stop process 84 controls the starting and stopping of all non-kernel processes of the system. The start/stop process receives a request from the system manager. Starting and stopping of process instances may be part of a process migration sequence from one processing module to another or maybe merely an initial start or rollback restart on one processing module. The start/stop process handles the precise timing and synchronisation of the start and stop commands required for controlling execution of processes which are cooperating with the other processes.

Referring now to FIG. 7 each module manager on the processing modules includes a processing module monitor 90 which runs an instance of this process. It is loaded immediately after the kernel on initial system startup. The process performs basic checking of the operational state of the processing module. It periodically receives a message from the processing module watchdog on the system manager requesting a processing module status report. If the processing module monitor fails to send a response message the processing module watchdog, following a retry, assumes that the particular processing module has failed.

The module manager also includes a process handler 91 which follows the state of process instances running on its processing module, maintaining an activation record and control block for each process instance. It performs the process schedule function. It also carries out create, start, stop and destroy operations on receipt of corresponding command messages received from the system manager. It calls on other functions in the module manager when carrying out these operations: for example creating a process instance may require downloading process files by the processing module loader.

In the system described above access to the loop or ring 15 can be by the control-token method. In this method a control-token is a unique bit-string which is passed around the ring in a round-robin fashion from module to module. When a module is in possession of the token, it may delay passing it on and, instead, transmit the contents of its send buffer followed by the token. The next module in line relays all messages (there may be several) until it reads the token, and then either sends its own message (if it has one) followed by the token, or relays the token immediately. This sequence continues indefinitely around the ring. The interface of each module monitors the address field of passing messages. If the incoming message is intended for itself, it takes a copy of it but still relays the message on to the next module. A message will eventually arrive back at the originator of the message who removes it by not relaying it. The originator knows which message to remove, as following transmission of the message and control-token there should be no other message reaching its receiver before its own message returns. This method of control requires a message delay at each module of only one or two bits.

What is claimed:

1. A processor control system for simultaneously (a) controlling items of hardware and (b) performing data processing functions not directly associated with control of hardware items, said system comprising:
    a plurality of interconnected digital signal processors arranged in pairs so that a pair of said processors is associated with each item of hardware, with each processor of such a pair being capable of independently controlling its associated item of hardware,
    at least one additional processor interconnected with said pairs of processors to provide, in conjunction with all other processors in the system, spare processing capacity for said data processing software processes,
    one processor of each said pair normally being arranged to operate at least one hardware control process for controlling its associated item of hardware and the other processor of each said pair normally being arranged to operate at least one data processing software process and wherein, in the event of a fault occuring in said hardware control process, then said data processing software process is transferred from said other processor to said provided spare processing capacity and the said at least one hardware control process is transferred to said other processor of that pair.

2. A processor control system as claimed in claim 1 wherein all said processors are linked by a loop type interconnection.

3. A processor control system as claimed in claim 1 further comprising a process store and wherein two of said additional processors providing said spare processing capacity are linked as a pair to said process store and said at least one data processing software process is initially transferred to said pair of additional processors.

4. A processor control system as claimed in claim 3 wherein said at least one data processing software process is subsequently transferred to at least one of said additional processors, providing spare processing capacity.

5. A processor control system as claimed in any one of claims 1–4 wherein recovery from a fault is controlled by an operating system which includes a system manager program arranged to operate on at least one of said processors and a module manager program associated with each said processor, each module manager program being arranged to receive commands from the system manager program and to control the management of processes on its respective processor.

6. A method of controlling items of hardware while simultaneously executing data processing software processes using a plurality of at least three processors, the method comprising the steps of:
    arranging a plurality 2N of the processors in pairs so that a pair of processors is associated with each item of hardware and so that there is at least one additional processor thereby providing at least 2N+1 processors in a common system to provide spare processing capacity,
    controlling each hardware item by means of at least one hardware control process operating in one processor of the associated said pair, and
    operating data processing softwre processes in the other processor of each said pair,
    wherein, when a detected fault occurs in one of said hardware processes, at least one data processing software process is transferred from said other processor of that pair to said provided spare processing capacity and said hardware control process is transferred to said other processor of that pair.

7. A method as claimed in claim 6 wherein two additional processors are linked as a pair to a process store and said at least one data processing software process is initially transferred to said pair of additional processors.

8. A method as claimed in claim 7 wherein said at least one data processing software process is subsequently transferred to at least one further additional processor.

9. In a system of data processors which system performs hardware control processes and which system has spare processor capacity, the improvement comprising:
- at least one pair of first processors, each of which is capable of performing both hardware control processes and data processing software processes and wherein only one processor of each said at least one pair of first processors is operative at any given time to perform said hardware control processes;
- at least one second processor providing spare processing capacity only for performing said data processing software processes; and
- said first processors being so arranged so as to respond to a detected fault in operation of a processor performing hardware control processes and (1) to transfer data processing software process functions from the other processor paired with the faulty processor to said provided spare processing capacity and (2) to stop performing the hardware control process in the faulty processor and to transfer the affected hardware control process to said other processor paired with the faulty processor, whereby processor capacity of said other processor paired with a processor performing hardware control processes may be productively utilized for data processing software processes while yet remaining available for hardware control processes when actually needed.

10. A processor control system for simultaneously (a) controlling items of hardware and (b) performing data processing, said system comprising:
- memory means for storing data processing software processes, and capable of loading said software processes into a processor for execution;
- a plurality of interconnected processors arranged in pairs so that a pair of said processors is associated with each item of controlled hardware;
- one processor (P1) of each said interconnected pair being normally arranged for controlling its associated hardware performing a hardware control process; and
- the other processor (P2) of each said pair being normally arranged to operate at least one data processing software process;
- at least one additional processor (P3) including some spare software processing capacity directly connected to said memory means and interconnected with said other plurality of interconnected processors such that data processing functions may be transferred therebetween; and
- means for detecting a fault in said one processor (P1) or in the execution of said at least one hardware control process and, for effecting the following actions in response to such fault detection:
  - (a) said at least one data processing software process, being operated in said other processor (P2), is terminated therein and transferred to a different processor;
  - (b) said at least one hardware control process, previously operating in said one processor (P1), is transferred to and thereafter executed in said other processor (P2); and
  - (c) said at least one data processing software process is loaded from said memory means to said spare capacity processor (P3), and thereafter executed therein.

11. A processor control system as in claim 10 wherein:
- there are at least two said additional processors (P3, P4) and wherein, in the event of fault in said one processor (P1) or in said at least one hardware control process, then, after events (a), (b), (c):
  - (d) said at least one data processing software process is transferred from one of the additional processors (P3) to the other (P4) when the system has spare time, thus minimizing demands on the system during times of processor failure.

12. A processor control system for simultaneously (1) controlling items of hardware and (2) performing data processing software process, said system comprising:
- a plurality of interconnected processors (P1, P2, P3 . . . ) at least some of which (P1, P2) are arranged in pairs so that a pair of said processors is associated with each item of controlled hardware;
- one processor (P1) of each said pair being normally arranged for controlling its associated hardware; and
- the other processor (P2) of each said pair being normally arranged to operate at least one data processing software process;
- wherein at least one of said interconnected processors (P3) is not connected to control said hardware but which has spare software processing capacity; and
- at least one of said processors including system manager means for detecting a fault occurring in one of the paired processors (P1), said system manager means operating to effect the following functions:
  - (a) at least some of said data processing software process being operated in said other processor (P2) is terminated in order to accommodate said at least one hardware control process previously operating in said one processor (P1); and
  - (b) said at least one hardware control process previously operating in said one processor (P1) is transferred to and executed in said other of the paired processors P2); and
  - (c) said terminated data processing software process is transferred to at least one other of said interconnected processors (P3) then having spare processing capacity.

* * * * *